(12) United States Patent
Cawood et al.

(10) Patent No.: US 10,167,927 B2
(45) Date of Patent: Jan. 1, 2019

(54) COMPRESSION WIRE JOINTS

(71) Applicant: Thomas & Betts International LLC, Wilmington, DE (US)

(72) Inventors: Matthew D Cawood, DeLeon Springs, FL (US); Ronald Vallette, Ormond Beach, FL (US)

(73) Assignee: Thomas & Betts International LLC, Wilmington, DE (US)

( * ) Notice: Subject to any disclaimer, the term of this patent is extended or adjusted under 35 U.S.C. 154(b) by 195 days.

(21) Appl. No.: 14/507,335

(22) Filed: Oct. 6, 2014

(65) Prior Publication Data

US 2015/0096159 A1     Apr. 9, 2015

Related U.S. Application Data

(60) Provisional application No. 61/887,122, filed on Oct. 4, 2013.

(51) Int. Cl.
| | | |
|---|---|---|
| *B23P 19/02* | (2006.01) | |
| *F16G 11/02* | (2006.01) | |
| *H01R 4/18* | (2006.01) | |
| *H01R 4/62* | (2006.01) | |
| *H01R 101/00* | (2006.01) | |

(52) U.S. Cl.
CPC ............ *F16G 11/02* (2013.01); *H01R 4/183* (2013.01); *H01R 4/62* (2013.01); *H01R 2101/00* (2013.01); *Y10T 29/53657* (2015.01)

(58) Field of Classification Search
USPC ......................................... 29/234, 235, 237
See application file for complete search history.

(56) References Cited

U.S. PATENT DOCUMENTS

| | | | |
|---|---|---|---|
| 690,819 A | 1/1902 | Anderson | |
| 1,113,080 A | 10/1914 | Wilson | |
| 2,614,304 A | 10/1952 | Oetiker | |
| 3,087,221 A | 4/1963 | Armstrong | |
| 3,295,176 A | 1/1967 | Bright | |
| 3,387,080 A * | 6/1968 | Dibble ................... H01R 4/16 174/71 R |
| 3,546,366 A | 12/1970 | Toedtman et al. | |
| 4,165,148 A * | 8/1979 | Campbell .......... H01R 43/0585 174/94 R |
| 4,426,754 A * | 1/1984 | Smith ..................... F16L 3/23 24/115 R |
| 4,583,773 A | 4/1986 | Janssen et al. | |
| 4,810,837 A * | 3/1989 | Giroux .................. H01B 17/22 174/172 |
| 4,832,380 A | 5/1989 | Oetiker | |
| 4,940,856 A * | 7/1990 | Bock ..................... H01R 4/186 174/84 C |
| 4,950,838 A | 8/1990 | Gordon | |
| 5,070,580 A | 12/1991 | Oetiker | |
| 5,613,281 A | 3/1997 | Oetiker | |
| 5,658,163 A | 8/1997 | DeRoss | |

(Continued)

*Primary Examiner* — Joseph J Hail
*Assistant Examiner* — Shantese McDonald
(74) *Attorney, Agent, or Firm* — Taft Stettinius & Hollister LLP

(57) ABSTRACT

An improved compression wire joint is disclosed that allows for tighter connections between the wires. It is particularly useful for connecting copper and aluminum wires together because it provides a tight connection that better accommodates thermal expansion of each wire.

13 Claims, 6 Drawing Sheets

(56) References Cited

U.S. PATENT DOCUMENTS

| | | |
|---|---|---|
| 6,649,840 B2 | 11/2003 | Triantopoulos et al. |
| 6,989,491 B2 | 1/2006 | Triantopoulos et al. |
| 7,165,436 B2 | 1/2007 | Bitz |
| 7,173,187 B2 | 2/2007 | Triantopoulos et al. |
| 7,631,908 B2 | 12/2009 | Meier et al. |
| 7,713,099 B2 | 5/2010 | Lai |
| 7,754,968 B2 * | 7/2010 | Fallstrom ............... H01R 4/183 174/84 C |
| 8,079,863 B2 | 12/2011 | Wason |
| 2002/0098745 A1 | 7/2002 | Triantopoulos et al. |
| 2002/0104198 A1 | 8/2002 | Craig, Jr. |
| 2004/0058571 A1 | 3/2004 | Triantopoulos et al. |
| 2005/0126255 A1 | 6/2005 | Bitz |
| 2006/0021783 A1 | 2/2006 | Triantopoulos et al. |
| 2008/0223614 A1 | 9/2008 | Fallstrom |
| 2010/0068946 A1 | 3/2010 | Lai |
| 2011/0073365 A1 | 3/2011 | Kuwayama et al. |
| 2013/0062114 A1 * | 3/2013 | Inoue ...................... C09D 4/00 174/72 A |

* cited by examiner

COMPRESSION WIRE JOINTS

CROSS-REFERENCES TO RELATED APPLICATIONS

This application claims benefit of priority to U.S. Provisional Application Ser. No. 61/887,122, filed Oct. 4, 2013, which is hereby incorporated by reference herein in its entirety.

FIELD OF THE INVENTION

The present invention is generally directed toward a new compression joint used to connect wires.

BACKGROUND OF THE INVENTION

Wire joints are often used to connect multiple copper conductors using a tubular connector. The wires are placed in the tubular connector and crimped together. However, due to increases in the cost of copper, the use of aluminum cable has increased. Joining copper and aluminum requires a special connector compatible with aluminum because aluminum wiring has a thermal expansion rate that is different from that of copper. Without a connector designed for joining aluminum and copper, the connection may loosen over time and result in overheating.

The typical connector used to join conductors of copper and aluminum must be sized specifically for the application, and each wire size combination requires a compression wire joint that is specific to the application. As a result, an installer must carry a large supply of the various sizes of crimping dies that are specific to each application, and there exists a large potential for installation errors if the incorrect wire, connector, or die is used. With high voltage applications, errors by installers and loose connections can lead to failure of the connection, resulting in overheating or even fires.

SUMMARY OF THE INVENTION

The presently disclosed compression wire joint provides a tighter connection between various wire sizes and types, yet allows standard crimping dies to be used. Because it can accommodate multiple sizes of wires, and is designed to be used with a standard crimping die, the potential for error is greatly reduced.

BRIEF DESCRIPTION OF THE DRAWINGS

Further advantages of the invention will become apparent by reference to the detailed description of preferred embodiments when considered in conjunction with the drawings.

DETAILED DESCRIPTION

The following detailed description is presented to enable any person skilled in the art to make and use the invention. For purposes of explanation, specific details are set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the scope of the invention. The present invention is not intended to be limited to the embodiments shown, but is to be accorded the widest possible scope consistent with the principles and features disclosed herein.

Figure 1:
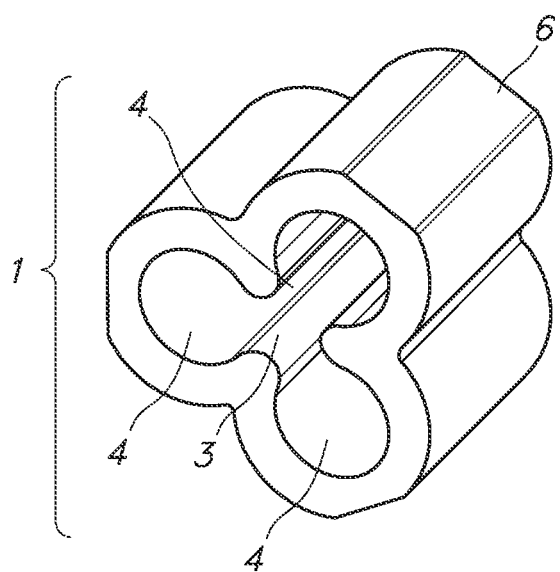
FIG. 1 depicts a perspective view of a compression wire joint having three lobes.
Figure 2:
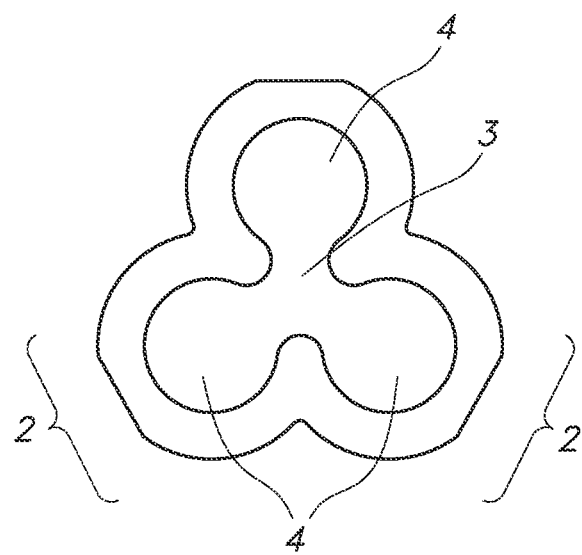
FIG. 2 depicts a front elevation view of a compression wire joint having three lobes.

Referring to the drawings, FIGS. 1 and 2 illustrate an embodiment of the compression wire joint 1. The compression wire joint 1 is comprised of a plurality of elongated tube-like structures which are partially open on one side and connected to each other along their lengths such that the interior space of each tube-like structure is continuous with each tube-like structure interior space. These tube-like structures are referred to herein as lobes 2. The particular embodiment shown in FIG. 1 is comprised of three lobes 2. An embodiment shown in FIGS. 6 and 7 has just two lobes 2, but it is contemplated that a compression wire joint 1 may also have a larger number of lobes 2, such as four, five, six, or more.

Figure 3:
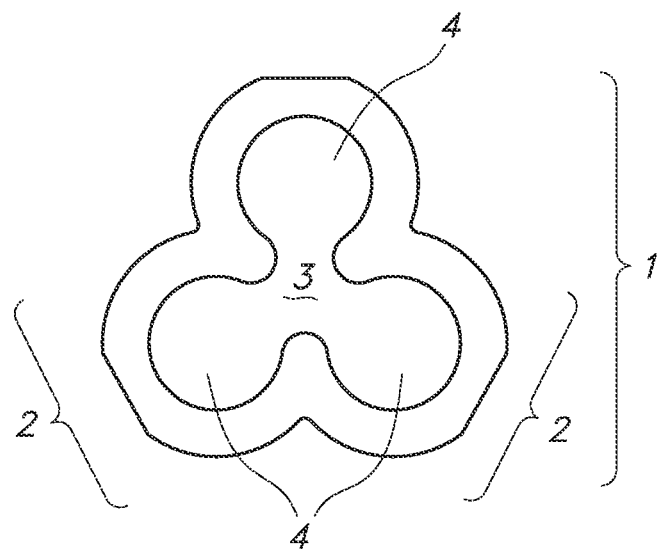
FIG. 3 depicts a front elevation view of a compression wire joint having three lobes of varying interior diameters.
Figure 8:
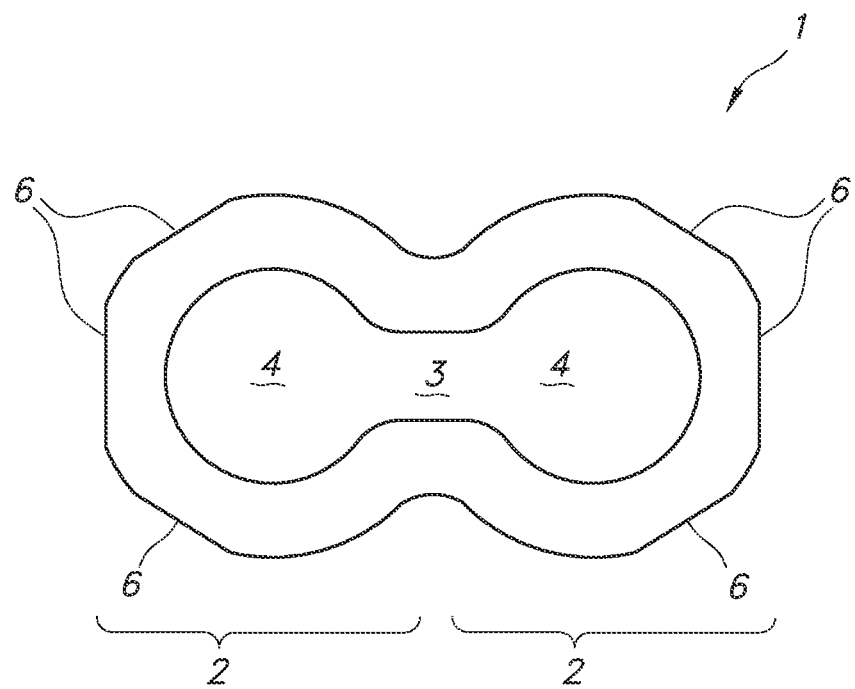
FIG. 8 depicts a front elevation view of a compression wire joint having two lobes with different interior diameters.

As will be appreciated from the figures, the interior surface of each lobe 2 partially encloses a space referred to as wire port 4. The section of each wire that is to be connected will be placed within the wire port 4. In the preferred embodiments, the inside diameter of each wire port 4 will be the same. This is useful when each wire that will sit within the wire port 4 is of approximately the same gauge. However, it is contemplated that other embodiments can accept wires into the wire ports 4 with significantly different gauges. For example, FIG. 3 shows a three-lobe embodiment having one lobe 2 with a smaller inside diameter than the other two. This would allow one smaller wire to be connected with two wires of similar sizes. Likewise, FIG. 8 shows a two-lobe embodiment having lobes 2 of varying inside diameters to accommodate different sized wires. In usage, the user would preferably select a compression wire joint 1 such that each wire port 4 is just slightly larger than the wire to be placed within it.

Figure 5A:
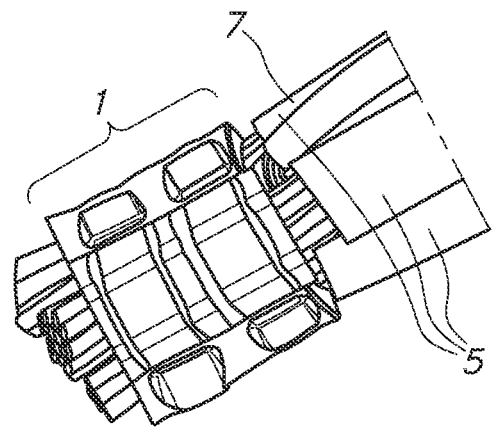
FIG. 5A depicts top elevation view of a compression wire joint having three lobes connecting four wires after crimping.
Figure 5B:
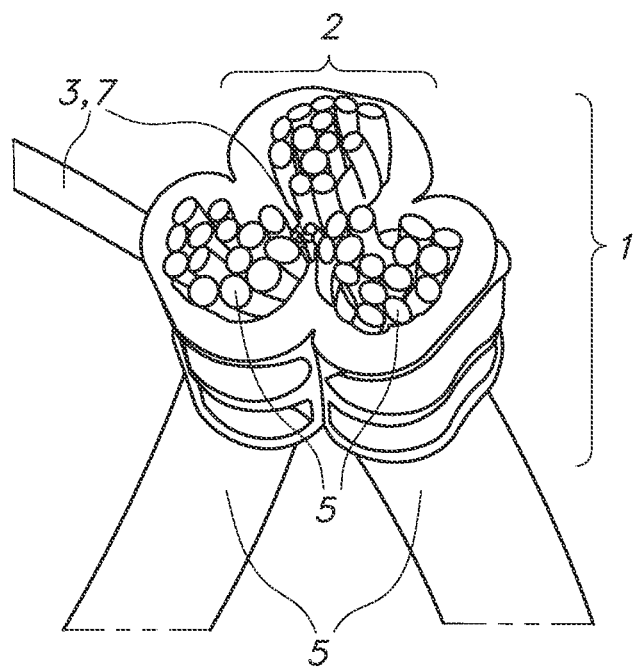
FIG. 5B depicts a perspective view of a compression wire joint having three lobes connecting four wires after crimping.
Figure 10A:
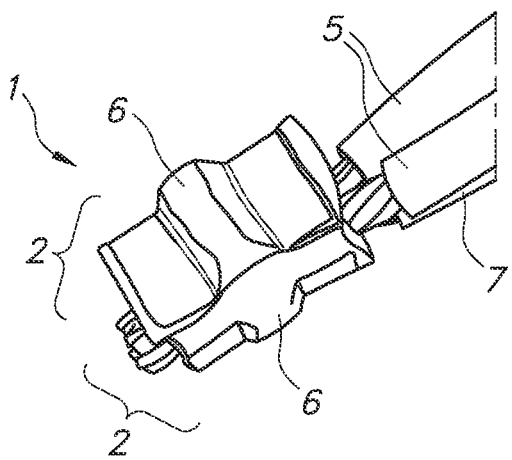
FIG. 10A depicts top elevation view of a compression wire joint having two lobes connecting three wires after crimping.
Figure 10B:
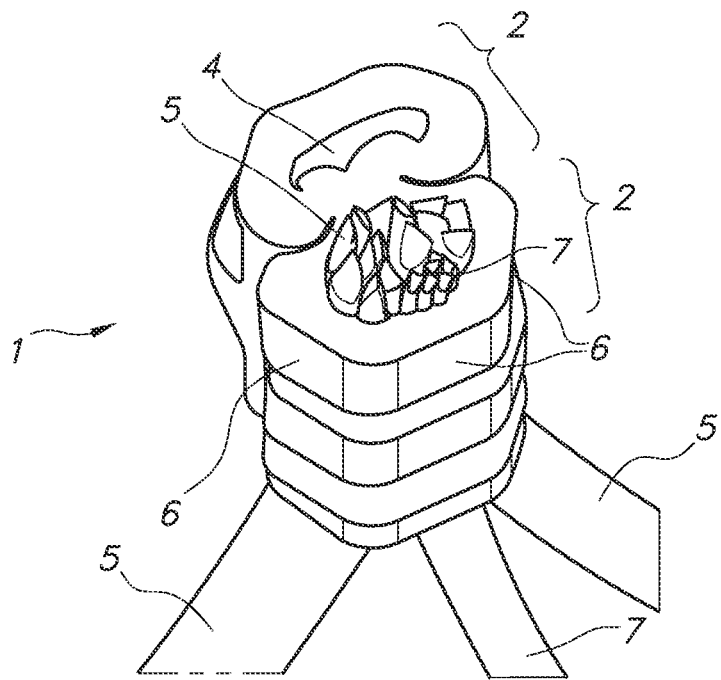
FIG. 10B depicts a perspective view of a compression wire joint having three lobes connecting three wires after crimping.

As can be seen in FIGS. 5A-5B and 10A-10B, wires 5, 7 of different gauges can be connected within a single compression wire joint 1. FIGS. 5A and 5B illustrate three wires 5 of a larger gauge being electrically connected with a wire 7 of a much smaller gauge in a compression wire joint 1 having three lobes 2. As can be seen in FIG. 5B, the larger gauge wires 5 were inserted into the three wire ports 4, while the small gauge wire 7 was inserted in the common interior area 3 prior to crimping. Similarly, FIGS. 10A and 10B illustrate two wires 5 of a larger gauge being electrically connected with a wire 7 of a much smaller gauge in a compression wire joint 1 having two lobes 2. As can be appreciated in FIG. 10B, a user may electrically connect three wires 5, 7 in a single wire port 4 of a compression wire joint 1 having two lobes 2. Thus, compression wire joint 1 of varying lobe 2 and wire port 4 numbers and sizes can be utilized in a number of applications to electrically connect a plurality of wires 5, 7 of varying numbers and gauges.

The compression wire joint 1 provides a better connection than the prior art because the separate wire ports 4 ensure that there are no internal voids and that each of the wires, regardless of size, are in contact with their respective lobes 2. However, it should also be appreciated that multiple wires could be inserted together into a single wire port 4, if required. They would all be crimped together, resulting in a strong connection. Additionally, smaller wires may be inserted into the common interior area 3 prior to crimping. In the case of the three-lobe design, three large wires would be in each of the three wire ports 4, and a fourth smaller wire would be inserted into the common interior area 3. This configuration can be seen in FIG. 5B. For the two-lobe design, two large wires would be placed in each of the two wire ports 4, and a third smaller wire would be inserted into the common interior area 3. Or, as shown in FIG. 10B, two large wires and a small wire can be inserted into a single wire port 4. While any electrically conductive wires can be joined using the compression wire joint 1, the compression wire joint 1 is particularly useful for connecting copper and aluminum wires together because the compression wire joint 1 provides a tight connection that better accommodates thermal expansion of each wire.

Figure 6:
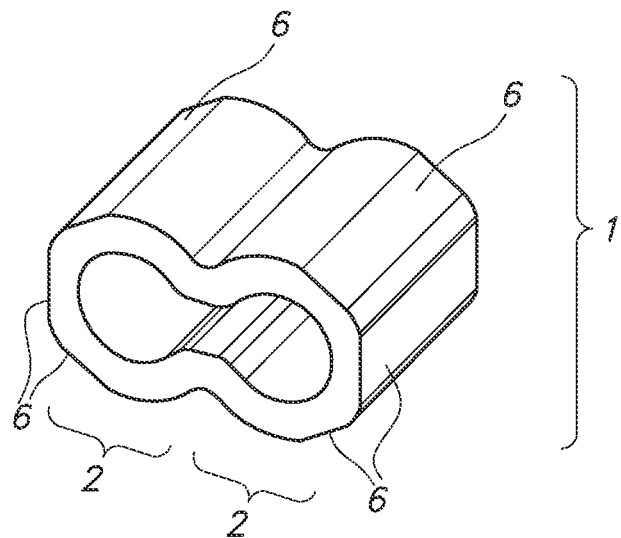
FIG. 6 depicts a perspective view of a compression wire joint having two lobes.
Figure 7:
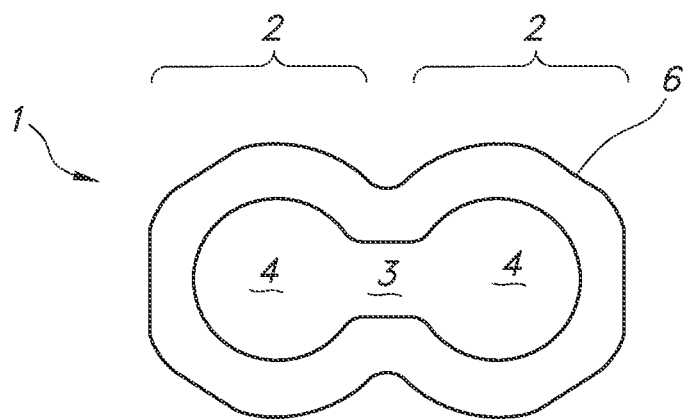
FIG. 7 depicts a front elevation view of a compression wire joint having two lobes.

The compression wire joint 1 is designed to be used with any crimping tool that can accept standard crimping dies, such as the THOMAS & BETTS BATTPAC compression tool or the THOMAS & BETTS TBMH 6-Ton hydraulic crimping head. The outer surface of the compression wire joint 1 has certain features that facilitate its use with standard hex-style crimp dies. As can be seen in FIGS. 1 and 6, the compression wire joint 1 has flat sections 6 along its perimeter. These flat sections 6 are angled such that they correspond with the flat surfaces of the crimp die. This makes it easier to select a proper crimp die to fit the compression wire joint 1 and prevents the compression wire joint 1 from slipping or rotating within the crimp die as pressure is applied.

Figure 4:
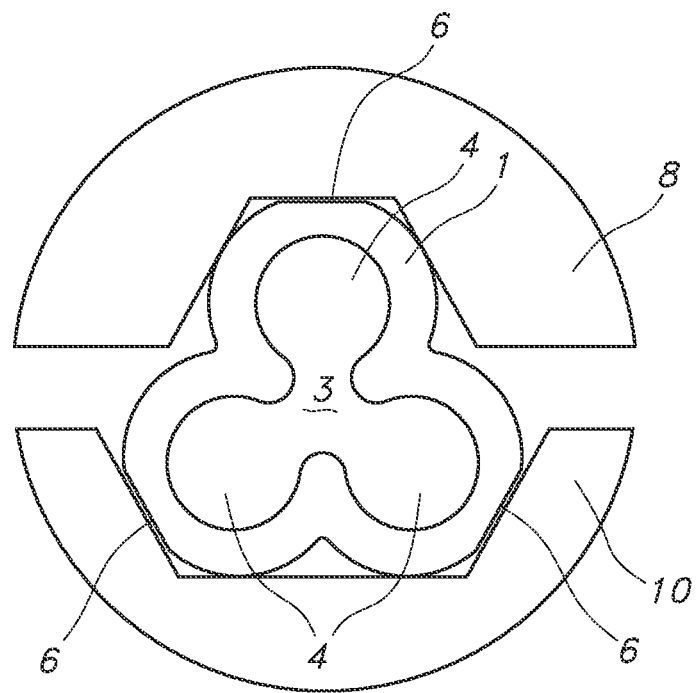
FIG. 4 depicts a front elevation view of a compression wire joint having three lobes as mounted in a crimping die.

As can be seen in FIG. 4, the geometry of the three-lobe compression wire joint 1 allows it to fit snugly within a mismatched pair of crimp dies. In this figure, the compression wire joint 1 is oriented such that the flat section 6 of a single lobe 2 will have pressure applied to it from the upper crimp die 8, and the other two lobes 2 will have pressure applied against them by lower crimp die 10. The upper crimp die 8 is selected from a standard set of smaller crimp dies, and lower crimp die 10 is selected from a standard set of larger crimp dies. Because standard crimp dies can be used, there is no need for a specialized crimp die. The user can simply select each half of the crimp die to best fit to the shape and size of the compression wire joint 1. In an embodiment, the compression wire joint 1 is marked with sizes or color codes that correspond to the proper sized crimp die to aid the installer.

Figure 9:
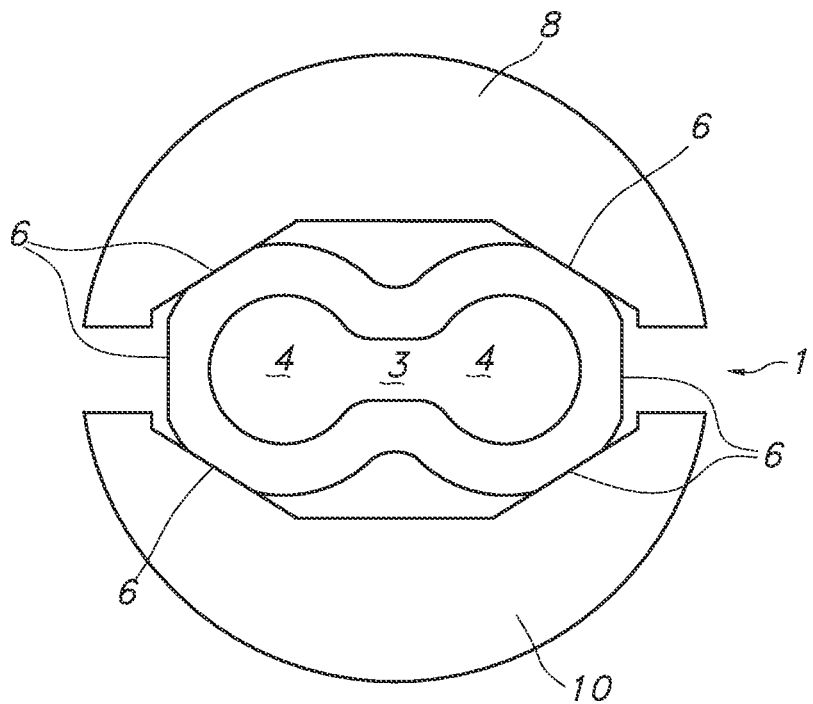
FIG. 9 depicts a front elevation view of a compression wire joint having two lobes as mounted in a crimping die.

FIG. 9 shows a two-lobe compression wire joint 1 placed into a matching pair of crimp dies. The flat sections 6 ensure that the compression wire joint 1 does not move as pressure is applied from the crimp tool. However, because the upper half of the compression wire joint 1 is identical to the lower half, a matching crimp die set can be used. The user simply selects the crimp die set that matches the compression wire joint 1.

The compression wire joint 1 is constructed of a conductive metal that is sufficiently malleable so that it can be deformed by the crimping tool. In a preferred embodiment, the compression wire joint 1 is made of aluminum. It can be made either by machining the aluminum or through impact extrusion. In a preferred embodiment, the aluminum is extruded into pieces of ten to twelve foot lengths, and is subsequently cut into smaller pieces. The length of the cut will depend on the desired size of the compression wire joint 1. Larger wires may require a longer compression wire joint 1 to ensure that the connection is strong. After the extruded aluminum is cut to the desired length, it may be tin plated to inhibit corrosion. It may additionally be packaged with an outside inhibitor compound to provide further environmental protection.

Use of compression wire joint 1 is simple compared to previous wire joints. The installer strips the outer jacket, if any, from the section of wires to be joined together. Each wire is then preferably placed into a wire port 4 of a compression wire joint 1 that was selected based on the gauges of the wires to be connected. However, it should be appreciated that each wire port 4 may accept more than one wire, if necessary. Once the wires are positioned within the compression wire joint 1, an upper and lower crimp die 10 is selected. The compression wire joint 1 preferably has indications on its surface regarding the size of the crimp die that should be used. In the case of a three-lobed crimp die, it would specify the size of both the upper crimp die 8 and the lower crimp die 10 to be used. The selected crimp dies are mounted on the crimp tool, and the compression wire joint 1, including the wires inserted into it, are then crimped together. A cover can then be placed around the wire joint to prevent incidents with the compression wire joint 1 or the bare wires.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

The invention has been described with reference to various specific and preferred embodiments and techniques. However, it should be understood that many variations and modifications may be made while remaining within the spirit and scope of the invention. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques described herein are intended to be encompassed by this invention. Whenever a range is disclosed, all subranges and individual values are intended to be encompassed. This invention is not to be limited by the embodiments disclosed, including any shown in the drawings or exemplified in the specification, which are given by way of example and not of limitation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

We claim:

1. A device for electrically joining a plurality of electrically conductive wires comprising:
   a. a first elongated tube-like structure having a first wire port along its length, the first wire port having a first interior size that is sized and positioned to receive a first electrically conductive wire;
   b. a second elongated tube-like structure having a second wire port along its length, the second wire port having a second interior size that is sized and positioned to receive a second electrically conductive wire;
   c. a third elongated tube-like structure having a third wire port along its length, the third wire port having a third interior size that is sized and positioned to receive a third electrically conductive wire; and
   d. an interior space in fluid communication with each of the first, second, and third wire ports, the interior space having an interior size that is smaller than each of the first, second, and third interior sizes;
   wherein each of the first, second, and third elongated tube-like structures has a lobed-shaped outer perimeter, and wherein a portion of the lobed-shaped outer perimeter includes a flat surface, each of the flat surfaces extending in different, and non-parallel, directions.

2. The device of claim 1, wherein the flat surface of each of the first, second, and third elongated tube-like structures is configured to interface with a flat surface of a hex-style crimp die.

3. The device of claim 1, wherein the flat surface of each of the first, second, and third elongated-tube-like structures is separated from each of the other flat surfaces by at least a rounded surface of one or more of the lobed-shaped outer perimeters.

4. The device of claim 1, wherein the first interior size is different than at least one of the second interior size and the third interior size.

5. The device of claim 1, wherein the device is constructed of extruded aluminum.

6. The device of claim 1, wherein the device is constructed of machined aluminum.

7. The device of claim 1, wherein the device is tin electro-plated.

8. A device comprising:
   a plurality of tubes, each of the plurality of tubes adjoined to an adjacent tube of the plurality of tubes along a length of the tubes, each tube of the plurality of tubes having:
      a lobe-shaped outer surface comprising a flat surface at an intermediate position about an outwardly rounded portion of the lobe-shaped outer surface, the flat surface shaped and positioned to interface with a crimping tool; and
      a wire port sized to receive at least one electrically conductive wire,
   wherein the device further includes an interior space that is in fluid communication with the wire port of each of the plurality of tubes, the wire port for each of the plurality of tubes being shaped to prevent passage of at least certain gauge electrically conductive wires in the wire port from entering into the interior space.

9. The device of claim 8, wherein the flat surface of each of the plurality of tubes is separated from the flat surface of the adjacent tube by at least a portion of the outwardly rounded surface of the lobe-shaped outer surface of the adjacent tube.

10. The device of claim 8, wherein the plurality of tubes comprises three tubes, and wherein the flat surface for each of the plurality of tubes extend in different, and non-parallel, directions.

11. The device of claim 8, wherein the wire port for at least one tube of the plurality of tubes has an internal size that is different than a corresponding internal size of at least one other tube of the plurality of tubes.

12. The device of claim 8, wherein, for each of the plurality of tubes, the wire port has a diameter, and wherein the diameter of the wire port is different for each of the plurality of tubes.

13. The device of claim 8, wherein the interior space has an internal size that is smaller than an interior size of at least one of the wire ports.

* * * * *